(12) United States Patent  
Carobolante (10) Patent No.: US 8,928,284 B2
(45) Date of Patent: Jan. 6, 2015

(54) VARIABLE WIRELESS POWER TRANSMISSION

(75) Inventor: Francesco Carobolante, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 12/850,538

(22) Filed: Aug. 4, 2010

(65) Prior Publication Data

US 2011/0057607 A1   Mar. 10, 2011

Related U.S. Application Data

(60) Provisional application No. 61/241,344, filed on Sep. 10, 2009.

(51) Int. Cl.
*H02J 7/00* (2006.01)
*H02J 7/02* (2006.01)
*H02J 17/00* (2006.01)

(52) U.S. Cl.
CPC *H02J 7/025* (2013.01); *H02J 17/00* (2013.01)
USPC ............................. 320/125; 320/108; 320/115

(58) Field of Classification Search
USPC .......... 320/108, 112, 113, 114, 115, 125, 155
See application file for complete search history.

(56) References Cited

U.S. PATENT DOCUMENTS

| 2004/0130915 A1 | 7/2004 | Baarman |
| 2005/0007067 A1 | 1/2005 | Baarman et al. |
| 2006/0113955 A1 | 6/2006 | Nunally |
| 2007/0145830 A1* | 6/2007 | Lee et al. ........... 307/135 |
| 2007/0279002 A1 | 12/2007 | Partovi |
| 2008/0174267 A1 | 7/2008 | Onishi et al. |
| 2008/0315826 A1 | 12/2008 | Alberth, Jr. et al. |
| 2010/0110741 A1* | 5/2010 | Lin et al. ........... 363/127 |
| 2010/0123429 A1* | 5/2010 | Chen et al. ........... 320/108 |
| 2010/0225272 A1 | 9/2010 | Kirby et al. |

FOREIGN PATENT DOCUMENTS

| JP | 2006141170 A | 6/2006 |
| JP | 2008503196 A | 1/2008 |
| WO | 2005122686 A2 | 12/2005 |

OTHER PUBLICATIONS

Written Opinion (Rule 66)—PCT/US2010/048536, PCT/IPEA—Oct. 19, 2011.
International Search Report and Written Opinion—PCT/US2010/048536, International Search Authority—European Patent Office—Nov. 5, 2010.

* cited by examiner

*Primary Examiner* — Edward Tso
*Assistant Examiner* — Aaron Piggush
(74) *Attorney, Agent, or Firm* — Knobbe, Martens, Olson & Bear, LLP (57) ABSTRACT

Exemplary embodiments are directed to variable power wireless power transmission. A method may include conveying wireless power to a device at a first power level during a time period. The method may further include conveying wireless power to one or more other devices at a second, different power level during another time period.

21 Claims, 8 Drawing Sheets

VARIABLE WIRELESS POWER TRANSMISSION

CLAIM OF PRIORITY UNDER 35 U.S.C. §119

This application claims priority under 35 U.S.C. §119(e) to:

U.S. Provisional Patent Application No. 61/241,344 entitled "DOCKING TRAY WITH DUAL CHARGING MODE" filed on Sep. 10, 2009, the disclosure of which is hereby incorporated by reference in its entirety.

BACKGROUND

1. Field

The present invention relates generally to wireless power, and more specifically, to a wireless power charging device configured to operate in various charging modes.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be understood by a person having ordinary skill in the art, due to loose coupling, a wireless charger may not be able to provide enough current to a battery of a portable computing device, such as a NetBook, to charge the battery in a reasonable time. Furthermore, providing a sufficient charge may require a very high field in a loosely coupled system, which may not satisfy Specific Absorption Rate (SAR) requirements.

A need exists for a wireless charging device configured to wirelessly provide power in a first mode for a loosely coupled system and a second, different mode for a tightly coupled system.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between a transmitter to a receiver without the use of physical electrical conductors.

Figure 1:
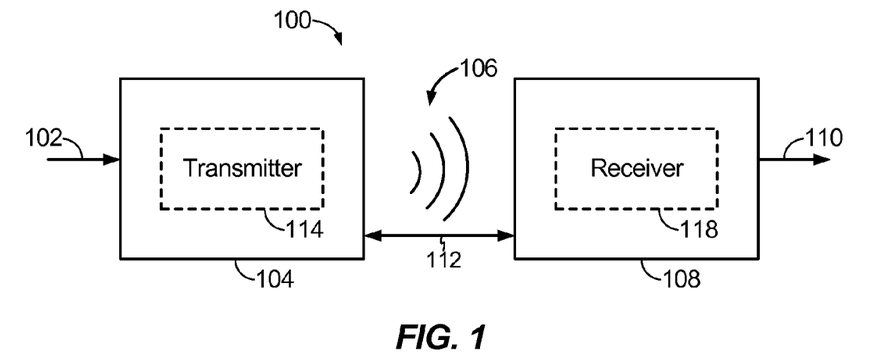
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
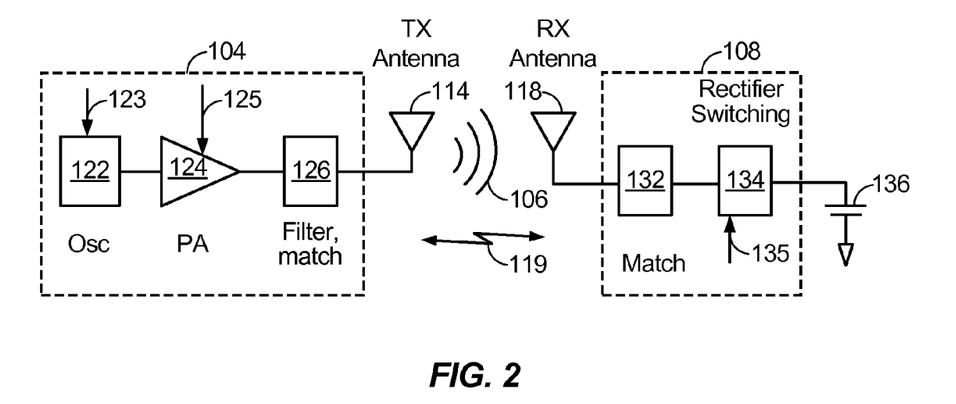
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
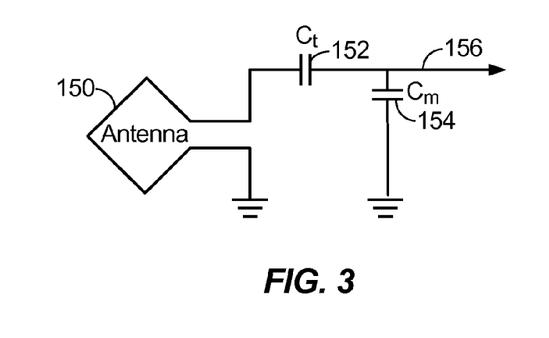
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
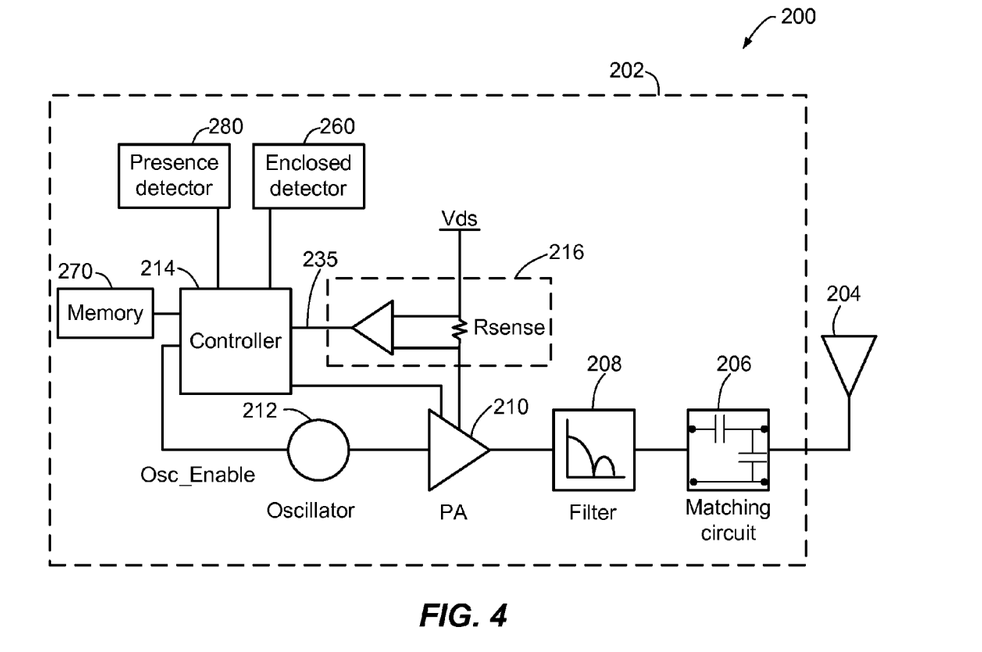
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
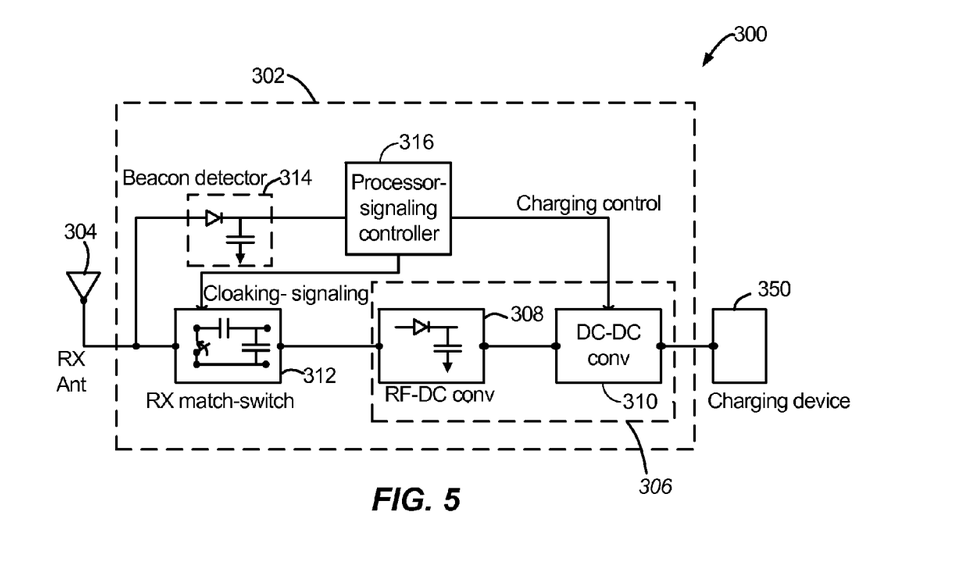
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-filed. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
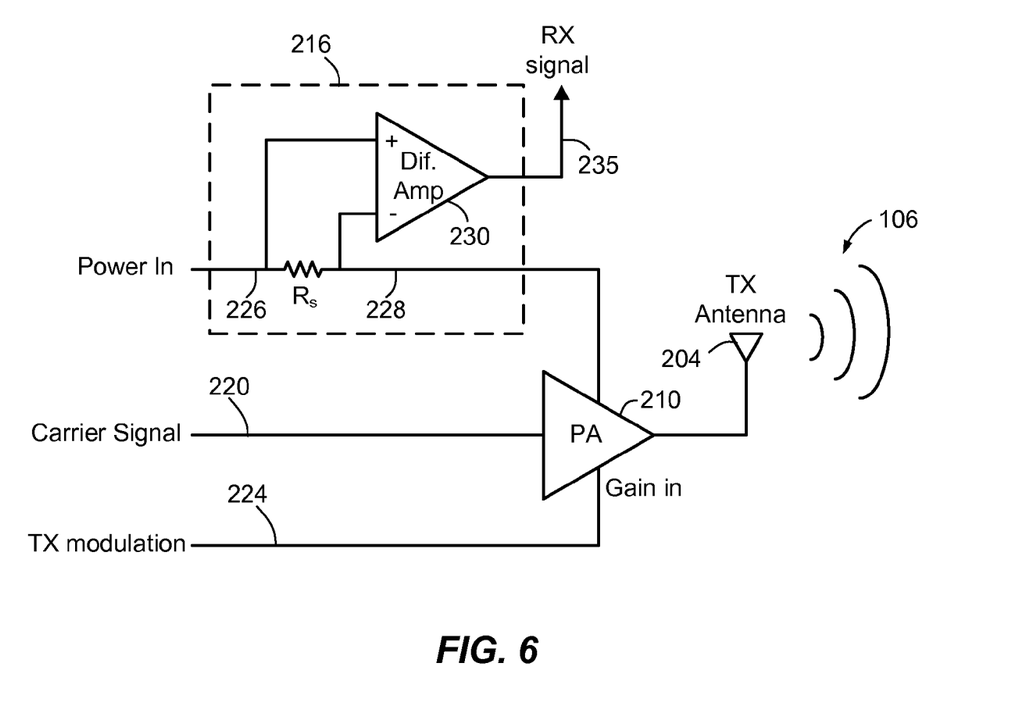
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204. It is noted that other types of modulation may be within the scope of the present invention.

Figure 7:
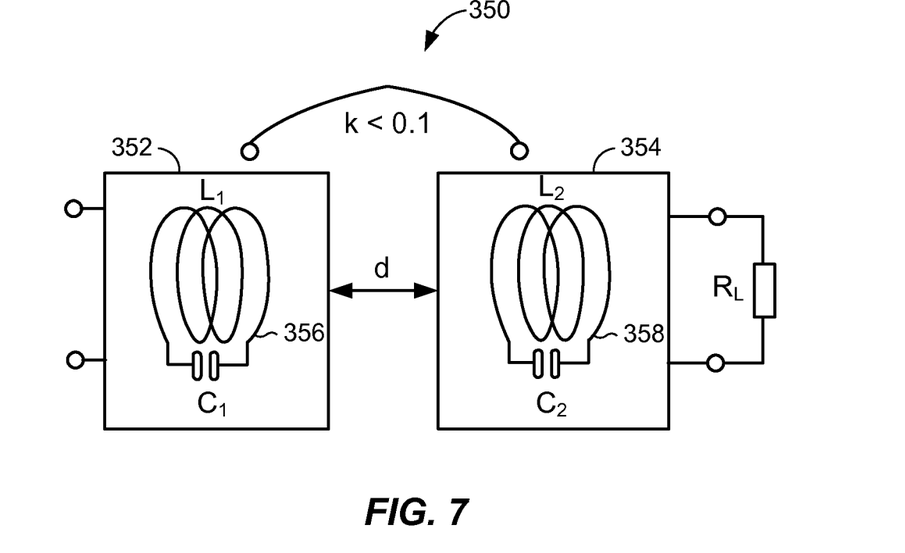
FIG. 7 illustrates proximity coupling of a transmitter and a receiver in a wireless power transmission system, in accordance with an exemplary embodiment of the present invention.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the current consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas. It is noted that other circuit may be implemented to detect variation in the load presented by the behavior of the receive antenna and associated circuitry Various exemplary embodiments disclosed herein identify different coupling variants which are based on different power conversion approaches, and the transmission range including device positioning flexibility (e.g., close "proximity" coupling for charging pad solutions at virtually zero distance or "vicinity" coupling for short range wireless power solutions). Close proximity coupling applications (i.e., strongly coupled regime, coupling factor typically k>0.1) provide energy transfer over short or very short distances typically in the order of millimeters or centimeters depending on the size of the antennas. Vicinity coupling applications (i.e., loosely coupled regime, coupling factor typically k<0.1) provide energy transfer at relatively lower efficiency over distances typically in the range from 10 cm to 2 m depending on the size of the antennas. While "vicinity" coupling between a transmitter and receiver may provide lower efficiency energy transfer, "vicinity" coupling provides flexibility in positioning of the receiver (with the device attached thereto) with respect to the transmitter antenna.

As described herein, "proximity" coupling and "vicinity" coupling may require different matching approaches to adapt power source/sink to the antenna/coupling network. Moreover, the various exemplary embodiments provide system parameters, design targets, implementation variants, and specifications for both LF and HF applications and for the transmitter and receiver. Some of these parameters and specifications may vary, as required for example, to better match with a specific power conversion approach FIG. 7 illustrates a functional block diagram of a first coupling variant between transmit and receive antennas, in accordance with an exemplary embodiment. The coupling variant 350 of FIG. 7 illustrates a "vicinity" coupling variant and may be used to couple to a high-Q resonant tank circuit used for "vicinity" coupling. Coupling variant 350 transforms impedances to match with power conversion circuitry resulting in an improved or high transfer efficiency. Specifically, coupling variant 350 includes a transmit antenna 352 configured to resonate and a resonant frequency and a receive antenna 354 configured to resonate at the same resonant frequency or at a frequency that is within a specified range of the resonant frequency.

Transmit antenna 352 includes a high-Q tank resonator 356, including capacitor $C_1$ and inductor $L_1$. Receive antenna 354 includes a high-Q tank resonator 358, including capacitor $C_2$ and inductor $L_2$. Vicinity coupling applications (i.e., loosely coupled regime with a coupling factor typically k<0.1) provide energy transfer at relatively low efficiency over distances d typically in the range from 10 cm to 2 m depending on the size of the antennas.

Figure 8:
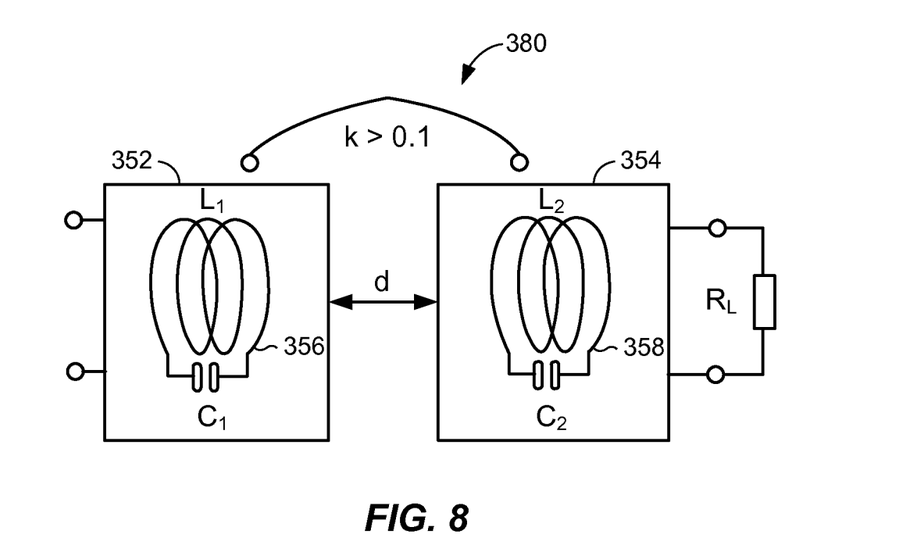
FIG. 8 illustrates vicinity coupling of a transmitter and a receiver in a wireless power transmission system, in accordance with an exemplary embodiment.

FIG. 8 illustrates a functional block diagram of a second coupling variant between transmit and receive antennas, in accordance with an exemplary embodiment. The coupling variant 380 of FIG. 8 illustrates a "proximity" coupling variant, in accordance with an exemplary embodiment. Coupling variant 380 includes the transmit antenna 352 and the receive antenna 354 of FIG. 7. The transmit antenna 352 includes the high-Q tank resonator 356, including capacitor $C_1$ and inductor $L_1$, and the receive antenna 354 includes the high-Q tank resonator 358, including capacitor $C_2$ and inductor $L_2$. Close proximity coupling applications (i.e., strongly coupled regime with a coupling factor typically k>0.1) provide energy transfer over short or very short distances d typically in the order of millimeters or centimeters, depending on the size of the antennas.

Generally, wireless power transfer according to resonant induction is improved by determining an optimum load resistance resulting in maximized transfer efficiency for given antenna parameters (e.g., unloaded Q-factors, L-C ratios, and transmitter source impedance). The optimum loading depends on coupling factor k. Conversely, there exists an optimum receive L-C ratio or load transformation maximizing efficiency for a given load resistance.

Exemplary embodiments of the invention are related to a wireless charging device configured to operate in one of a plurality of charging modes while maintaining compatibility with FCC/SAR regulations. The wireless charging device may be configured to provide power to a large load (e.g., a laptop computer) in a tightly coupled system or provide power to one or more smaller loads (e.g., mobile telephones or media players) in a loosely coupled system.

The wireless charging device may include at least one wireless power transmitter configured to transmitting wireless power within an associated near-field region. According to one exemplary embodiment, the at least one wireless power transmitter may be configured to vary, depending on a type of one or more chargeable devices positioned within an associated charging region, an amount of power wirelessly transmitted therefrom. More specifically, the wireless power transmitter may be configured for dedicated (i.e., 1 to 1) high-power charging for a high capacity battery, such as a battery of a laptop computer (e.g., a Netbook or a Smartbook). Stated another way, the wireless power transmitter may be configured to transmit a relatively high level of power to a single device, which forms a tightly coupled system (i.e., proximity coupling) with the wireless charging device. Furthermore, the wireless power transmitter may be configured for low-power charging for one or more (e.g., 1 to many) low capacity batteries, such as a battery of a mobile telephone or a media player. Stated another way, the wireless charging device may be configured to transmit a relatively low level of power to one or more devices, which form a loosely coupled system (i.e., vicinity coupling) with the wireless charging device.

As will be appreciated by a person having ordinary skill in the art, chargeable batteries of relatively low power devices, such as, for example only, a cellular telephone or a portable media player, may require approximately 2 to 3 watts of power for adequate charging. On the other hand, chargeable batteries of relatively high power devices, such as a laptop computer, may require approximately 60 watts of power for adequate charging. Accordingly, wirelessly transmitting an adequate amount of power to a relatively high power device in a loosely coupled system may result in greater power loss than transmitting an adequate amount of power to one or more small devices in a loosely coupled system. Furthermore, although a loosely coupled system may exhibit a higher percentage of loss compared to a tightly coupled system, if the amount of power transmitted in a loosely coupled system is relatively low (e.g., 2 to 3 watts), the amount of power lost may also be relatively low. Conversely, if the amount of power transmitted in a loosely coupled system is relatively high (e.g., 60 watts) the amount of power lost may also be relatively high.

Figure 9:
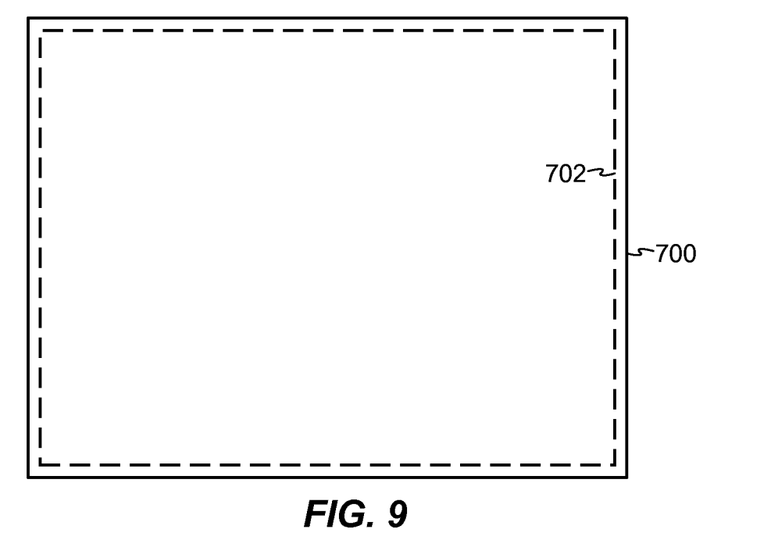
FIG. 9 is a block diagram of a wireless charging device, in accordance with an exemplary embodiment of the present invention.

FIG. 9 is a block diagram of a wireless charging device 700 including a transmitter (e.g., transmitter 200 of FIG. 4) and at least one associated transmit antenna 702. For example only, wireless charging device 700 may comprise a charging tray, a charging pad, a docking station, or any combination thereof. It is noted that the term "high power device," as used herein comprises a device that requires a relatively high amount of power (e.g., 60 watts) to be charged in comparison to a low power device, such as, for example only, a cellular telephone, a Bluetooth headset, or a portable media player, which may require, for example only, 2 to 3 watts of power to be charged. Moreover, a high power device may comprise a receive antenna having dimensions that are substantially similar to the dimensions of transmit antenna 702 of a wireless charging device 700. Furthermore, as used herein the term "low power device" (e.g., a device that requires low power to be charged (e.g., 2 to 3 watts) relative to a high power device) may comprise a device having a receive antenna with dimensions that are substantially smaller than the dimensions of transmit antenna 702 of a wireless charging device 700.

As described more fully below, depending on a type of one or more chargeable devices positioned within an associated charging region of wireless charging device 700, wireless charging device 700 may be configured to adjust an amount of power transmitted therefrom. More specifically, wireless charging device 700 may be configured to transmit power at a power level in a tightly coupled system (i.e., proximity coupling) and transmit power at another, lesser power level in a loosely coupled system (i.e., vicinity coupling). Stated another way, if one or more relatively low power devices (e.g., one or more mobile telephones) are positioned within a charging region of wireless charging device 700 (e.g., on a surface of wireless charging device 700), wireless charging device 700 may be configured to transmit a relatively small amount of power (e.g., 2-3 watts per device actively receiving power). Conversely, if a large device (e.g., a laptop) is positioned within a charging region of wireless charging device 700, wireless charging device 700 may be configured to transmit an amount of power (e.g., 60 watts), which is relatively high compared to the amount of power transmitted while one or more small devices are positioned within the charging region. Such change in the amount of power may be actively controlled by 700 or may be automatically obtained by the characteristic impedance that one or more chargeable device presents to wireless charging device 700.

Figure 10:
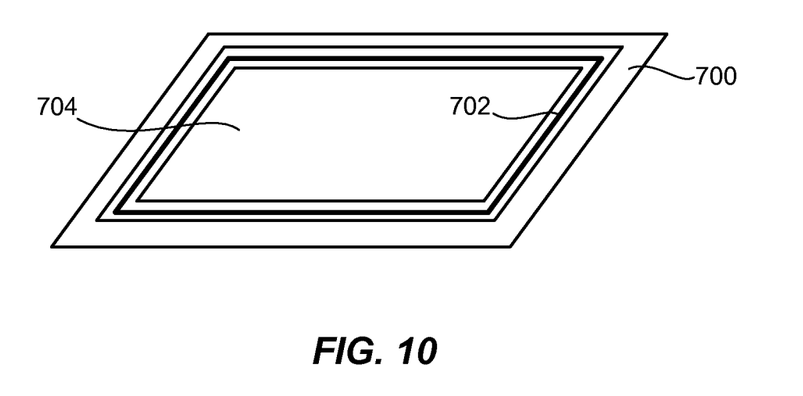
FIG. 10 is an illustration of a wireless charging device having at least one transmit antenna, according to an exemplary embodiment of the present invention.

FIG. 10 is another illustration of wireless charging device 700. As illustrated in FIG. 10, wireless charging device 700 includes a surface 704 for placement of a large chargeable device (e.g., a laptop) or one or more small chargeable devices (e.g., a cellular telephone, a media player, or a camera).

As described more fully below, according to an exemplary embodiment of the present invention, wireless charging device 700 may be configured to perform a loading analysis to determine what type or types of chargeable devices are positioned within an associated near-field region. Stated another way, wireless charging device 700 may be configured to analyze a loading effect of receive antennas positioned within an associated near field region on the associated transmitter (i.e., whether a relatively large load exists or a relatively small load exists). The loading analysis may enable wireless charging device 700 to determine whether a tightly coupled system is formed with one relatively large device positioned within an associated near-field region or whether a loosely coupled system is formed having one or more relatively small devices positioned within an associated near-field region. According to another exemplary embodiment, a chargeable device, which is positioned within a near-field region of wireless charging device 700, may communicate its presence and its "type" (i.e., whether it is a relatively high power (e.g., a laptop) forming a tightly coupled system or whether it is a relatively low power device (e.g., a mobile telephone) forming a loosely coupled system) to wireless charging device 700.

Furthermore, in response to determining that a relatively high power device is present and a tightly coupled system is formed, wireless charging device 700 may allow for transmission of an appropriate amount of power (e.g., 60 watts) to charge the relatively high power device. Similarly, in response to determining that one or more relatively low power devices are present and a loosely coupled system is formed, wireless charging device 700 may transmit an adequate amount of power (e.g., 2-3 watts) to charge the one or more relatively low power devices. Moreover, it is noted that wireless charging device 700 may modify how an associated transmit antenna is driven to optimize power transmission from the associated transmit antenna to one or more devices positioned within an associated charging region.

Figure 11:
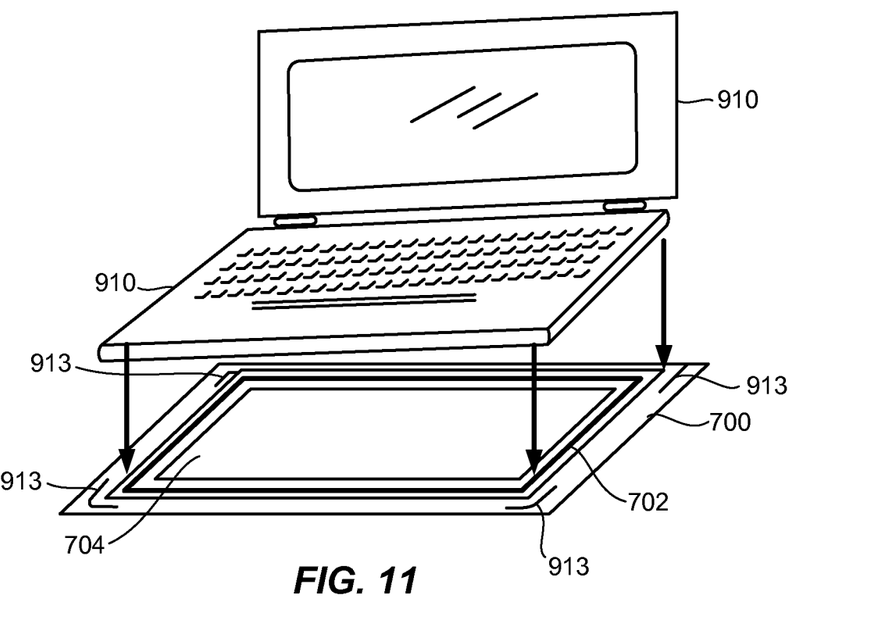
FIG. 11 is an illustration of a chargeable device being positioned on a wireless charging device, in accordance with an exemplary embodiment of the present invention.

FIG. 11 depicts a device 910, which may comprise, for example, a laptop computer, being positioned on wireless charging device 700. Device 910 may include a receiver (not shown in FIG. 11, see e.g., receiver 300 of FIG. 5) and at least one associated receive antenna (also not shown in FIG. 11; see e.g., receive antenna 304 of FIG. 5). As noted above, a relatively high power device (e.g., a laptop computer such as device 910) may require a relatively large amount of power (e.g., 60 watts) for a sufficient charge. Accordingly, device 910 should be positioned adjacent wireless charging device 700 to enable a receive antenna of device 910 to be positioned adjacent to transmit antenna 702 and, as a result, a tightly coupled system may exist.

Accordingly to one exemplary embodiment, wireless charging device 700 may be configured to enable an associated transmit antenna 702 to substantially align with a receive antenna of a relatively high power device, such as a laptop computer. As will be appreciated by a person having ordinary skill in the art, substantially aligning transmit antenna 702 with a receive antenna of a relatively high power device may provide for a tightly coupled system (i.e., proximity coupling). For example only, wireless charging device 700 may include one or more alignment devices (e.g., one or more grooves, one or more brackets, or any combination thereof), configured to assist a device user to substantially align transmit antenna 702 with a receive antenna of a specific, relatively high power device. More specifically, as one example, wireless charging device 700 may include one or more alignment devices 913 configured for positioning device 910 on surface 704 to substantially align transmit antenna 702 with a receive antenna of device 910. As another example, wireless charging device 700 may comprise a docking station configured for substantially aligning transmit antenna 702 with a receive antenna of a relatively high power device positioned within a near-field region of wireless charging device 700. It is noted that wireless charging device 700 may include one or more alignment devices, a device to be charged (e.g., device 910) may include one or more alignment devices, or both wireless charging device 700 and device 910 may include one or more alignment devices to enable respective antennas to be substantially aligned, and, as a result, provide a tightly coupled system.

It is noted that an alignment device (e.g., alignment device 913) or a docking station may be configured to detect a relatively high power device positioned within a near-field region of wireless charging device 700. For example only, alignment device 913 or a docking station may include one or more sensors to detect a relatively high power device positioned within a near-field region of wireless charging device 700. Accordingly, wireless charging device 700 may be configured to detect a tightly coupled system. It is further noted that after wireless charging device 700 determines that a tightly coupled system is formed with a relatively high power device, wireless charging device 700 may transmit a relatively large amount of power (e.g., 60 watts), which is sufficient to charge the device 910.

It is further noted that wireless charging device 700 may be specifically designed and manufactured for a specific device 910, or vice versa. Accordingly, antennas within each of wireless charging device 700 and device 910 may be positioned so as to substantially align upon device 910 being positioned within a charging region of wireless charging device 700.

Figure 12:
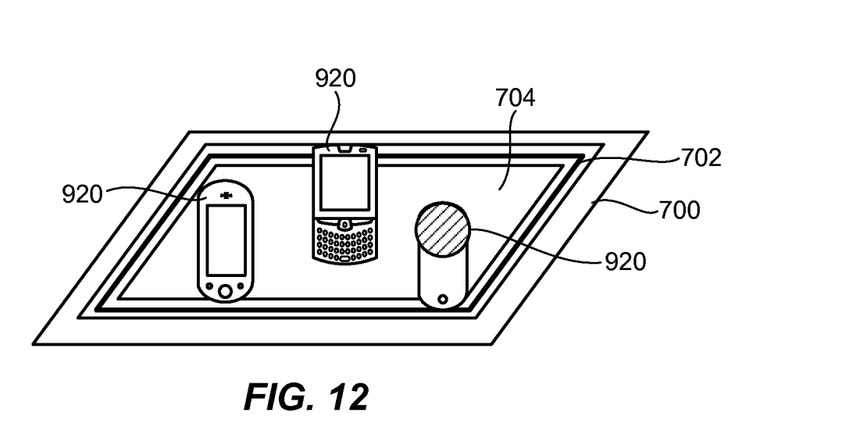
FIG. 12 illustrates a plurality of chargeable devices positioned on a wireless charging device, according to an exemplary embodiment of the present invention.

FIG. 12 illustrates a plurality of devices 920 positioned on surface 704 of wireless charging device 700. Each device 920 may include a receiver (not shown in FIG. 12, see e.g., receiver 300 of FIG. 5) and at least one associated receive antenna (also not shown in FIG. 12; see e.g., receive antenna 304 of FIG. 5). By way of example only, device 920 may comprise a cellular telephone, a portable media player, a camera, a gaming device, a navigation device, a headset (e.g., a Bluetooth headset), or any combination thereof. As noted above, a relatively low power device (e.g., a mobile telephone) may require a relatively small amount of power (e.g., 2-3 watts) for a sufficient charge. As will be appreciated by a person having ordinary skill in the art, loosely coupled system may be formed with one or more devices 920, which may be placed freely within a charging region of wireless charging device 700. After wireless charging device 700 determines that a loosely coupled system is formed with one or more relatively low power devices 920, wireless charging device 700 may transmit a relatively small amount of power (e.g., 2-3 watts), which is sufficient to charge the one or more devices 920.

Figure 13:
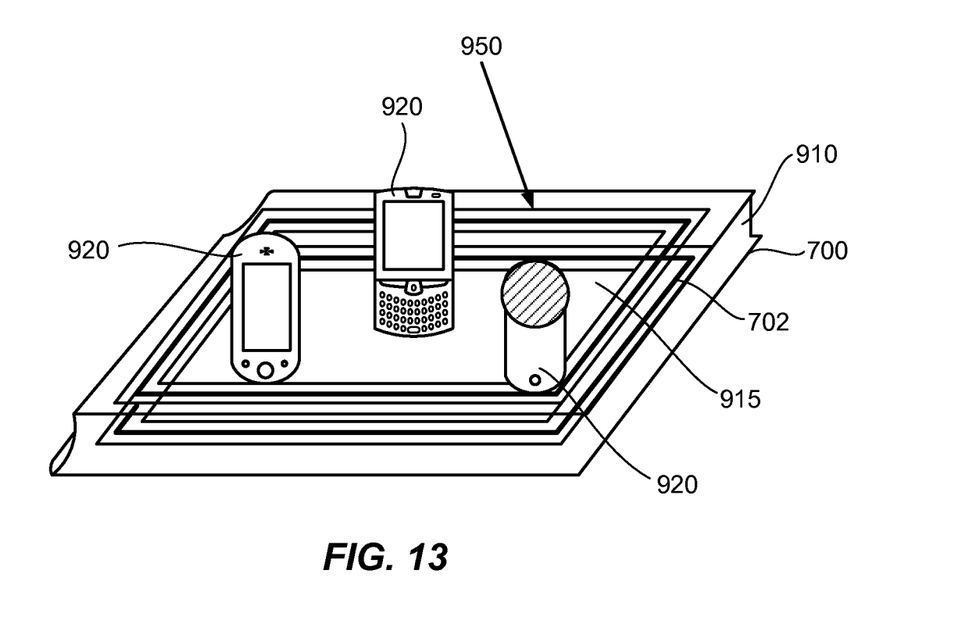
FIG. 13 illustrates a plurality of chargeable devices positioned on another chargeable device, which is positioned on a wireless charging device, according to an exemplary embodiment of the present invention.

FIG. 13 depicts device 910, which, as noted above, may comprise, for example, a laptop computer, being positioned on wireless charging device 700. As noted above, device 910 may include a receiver (not shown in FIG. 11, see e.g., receiver 300 of FIG. 5). As also noted above, device 910 may be positioned on surface 704 (see FIG. 10) of wireless charging device 700 to enable transmit antenna 702 to be substantially aligned with a receive antenna of device 910 and, as a result a tightly coupled system may exist between device 910 and wireless charging device 700. After wireless charging device 700 determines that a tightly coupled system is formed with a relatively high power device 910, wireless charging device 700 may transmit a relatively large amount of power (e.g., 60 watts), which is sufficient to charge the device 910.

Furthermore, FIG. 13 also illustrates a plurality of devices 920 positioned on surface 915 of device 910. As noted above with respect to FIG. 12, each device 920 may include a receiver (not shown in FIG. 12; see e.g., receiver 300 of FIG. 5) and at least one associated receive antenna (also not shown in FIG. 12; see e.g., receive antenna 304 of FIG. 5). According to one exemplary embodiment, antenna 950 may comprise a repeater antenna. As will be understood by a person having ordinary skill in the art, in an exemplary embodiment wherein antenna 950 comprises a repeater antenna, antenna 950 may be configured to act as a relay for power wirelessly transmitted from transmit antenna 702. Therefore, in accordance with one exemplary embodiment, wireless power, which is transmitted from wireless charging device 700 to device 910 in a tightly coupled system may be repeated (i.e., re-transmitted) from device 910 to devices 920 in a loosely coupled system.

According to another embodiment, device 910 may include a receive antenna (e.g., receive antenna 300 of FIG. 5) and antenna 950, which is configured to wirelessly transmit power from device 910 to one or more chargeable devices (e.g., devices 920) positioned within an associated near-field. Therefore, in accordance with one exemplary embodiment, device 910 may wirelessly transmit power to one or more devices 920 in a loosely coupled system. After wireless charging device 700 determines that a loosely coupled system is formed with one or more relatively low power devices 920, wireless charging device 700 may transmit a relatively small amount of power (e.g., 2-3 watts per device 920), which is sufficient to charge the one or more devices 920. It is noted antenna 300 of device 910 may be configured to operate as a repeater antenna, a receive antenna, or both.

Figure 14:
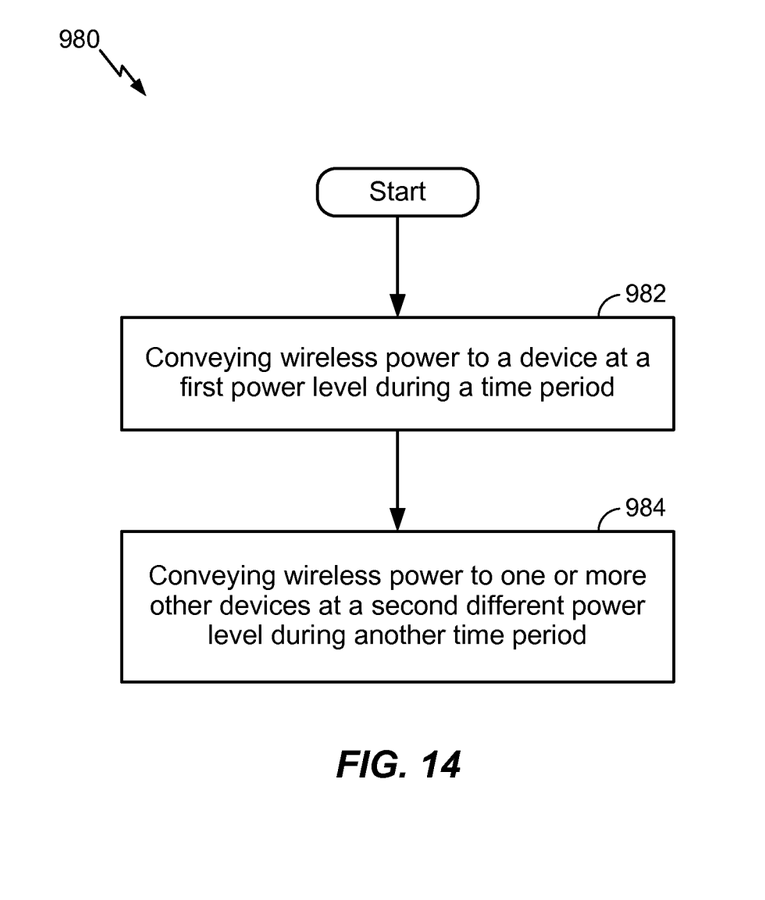
FIG. 14 is a flowchart illustrating a method, in accordance with an exemplary embodiment of the present invention.

FIG. 14 is a flowchart illustrating a method 980, in accordance with one or more exemplary embodiments. Method 980 may include conveying wireless power to a device at a first power level during a time period (depicted by numeral 982). Method 980 may further include conveying wireless power to one or more other devices at a second, different power level during another time period (depicted by numeral 984).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless charging device, comprising:
   at least one transmitter; and
   at least one transmit antenna associated with the at least one transmitter, wherein the at least one transmitter is configured to operate at a first power level to charge a first chargeable device during a first time period and a second power level to charge at least a second chargeable device during a second time period, wherein operating the at least one transmitter at the first or second power level depends on the degree of a coupling factor between the at least one transmit antenna and at least one receive antenna of the first or second chargeable device,
   wherein the first power level is higher than the second power level, and
   wherein the coupling factor between the at least one transmit antenna and the at least one receive antenna of the first chargeable device is higher than the coupling factor between the at least one transmit antenna and the at least one receive antenna of the second chargeable device.

2. The device of claim 1, wherein the at least one transmitter is configured to operate at the first power level while the first chargeable device and the wireless charging device have a coupling factor greater than 0.1.

3. The device of claim 1, wherein the at least one transmitter is configured to operate at the second power level while the second chargeable device and the wireless charging device have a coupling factor less than 0.1.

4. The device of claim 1, wherein the at least one transmitter is configured to detect a loading effect of one or more receive antennas positioned within an associated charging region.

5. The device of claim 4, wherein the at least one transmitter is configured to determine if either a coupling factor less than 0.1 exists with the one or more receive antennas or a coupling factor greater than 0.1 exists with the one or more receive antennas based on at least one of the detected loading effect, communication means, and an alignment device.

6. The device of claim 1, wherein the first chargeable device comprises a receive antenna having a dimension similar to a dimension of the transmit antenna.

7. The device of claim 1, further comprising an alignment device configured to enable alignment of a receive antenna of the first chargeable device with the transmit antenna of the at least one transmitter.

8. The device of claim 1, wherein the second chargeable device comprises at least one of a cellular telephone, a portable media player, a camera, a gaming device, a navigation device, and a headset.

9. The device of claim 1, further comprising a charging surface configured for placement of the first and second chargeable devices.

10. The device of claim 9, wherein the transmit antenna is positioned proximate the charging surface.

11. The device of claim 1, wherein the wireless charging device comprises at least one of a docking station, a charging tray, and a charging pad.

12. A method of charging one or more devices at a wireless charging device, comprising:
   providing wireless power to charge a first chargeable device at a first power level during a first time period; and
   providing wireless power to charge at least a second chargeable device at a second, different power level during a second time period,
   wherein providing wireless power to charge the first or second chargeable device at the first or second power level depends on the degree of a coupling factor between at least one transmit antenna of the wireless charging device and at least one receive antenna of the first or second chargeable device, and
   wherein the first power level is higher than the second power level, and
   wherein the coupling factor between the at least one transmit antenna and the at least one receive antenna of the first chargeable device is higher than the coupling factor between the at least one transmit antenna and the at least one receive antenna of the second chargeable device.

13. The method of claim 12, wherein conveying wireless power to the device comprises conveying wireless power to a laptop computer.

14. The method of claim 12, wherein conveying wireless power to the second chargeable device comprises conveying wireless power to at least one of a cellular telephone, a portable media player, a camera, a gaming device, a navigation device, and a headset.

15. The method of claim 12, further comprising determining that the first chargeable device and the wireless charging device have a coupling factor greater than 0.1 prior to conveying wireless power to the device at the first power level.

16. The method of claim 12, further comprising determining that the first chargeable device and the wireless charging device have a coupling factor greater than 0.1 comprises at least one of detecting a loading effect on the wireless charging device, communicating between the first chargeable device and the wireless charging device, and sensing the first chargeable device with an alignment device of the wireless charging device.

17. The method of claim 12, further comprising determining that the second chargeable device and the wireless charging device have a coupling factor less than 0.1 prior to conveying wireless power to the second chargeable device at a second, different power level.

18. The method of claim 12, further comprising determining that the second chargeable device and the wireless charging device have a coupling factor less than 0.1 comprises at least one of detecting a loading effect between the second chargeable device and the wireless charging device and exchanging data between the second chargeable device and the wireless charging device.

19. The method of claim 12, further comprising aligning a receive antenna of the first chargeable device with a transmit antenna of the wireless charging device prior to conveying wireless power to the first chargeable device at the first power level.

20. The method of claim 19, wherein the aligning comprises aligning the receive antenna of the first chargeable device with the transmit antenna of the wireless charging device with at least one alignment mechanism coupled to the wireless charging device.

21. A wireless charging device for charging one or more devices at the wireless charging device, comprising:
   means for conveying wireless power to a first chargeable device at a first power level during a first time period; and
   means for conveying wireless power to at least a second chargeable device at a second, different power level during a second time period, wherein conveying wireless power at the first or second power level depends on the degree of a coupling factor between the at least one transmit antenna of the wireless charging device and at least one receive antenna of the first or second chargeable device, wherein the first power level is higher than the second power level, and wherein the coupling factor between at least one transmit antenna and at least one receive antenna of the first chargeable device is higher than the coupling factor between the at least one transmit antenna and at least one receive antenna of the second chargeable device.

\* \* \* \* \*